United States Patent [19]

Thibodeau

[11] Patent Number: 4,999,145
[45] Date of Patent: Mar. 12, 1991

[54] METHOD OF FORMING HYBRID ARC TUBES

[75] Inventor: Rodrigue G. Thibodeau, Marblehead, Mass.

[73] Assignee: GTE Laboratories Incorporated, Waltham, Mass.

[21] Appl. No.: 451,406

[22] Filed: Dec. 15, 1989

[51] Int. Cl.$^5$ .............................................. C04B 35/10
[52] U.S. Cl. ...................................... 264/60; 264/1.2; 264/63
[58] Field of Search ............................. 264/60, 63, 1.2

[56] References Cited

U.S. PATENT DOCUMENTS 4,387,067 6/1983 Kobayashi et al. .................... 264/63

OTHER PUBLICATIONS

Hing, Po, Use of Cold Isostatic Pressing for the Fabrication of Some Lamp Ceramic Materials, Interceram, Nov. 1984, pp. 33-36.

Richerson, D. W., "Modern Ceramic Engineering", pp. 187-196.

Primary Examiner—James Derrington
Attorney, Agent, or Firm—Carl F. Ruoff

[57] ABSTRACT

Disclosed is a method for forming alumina arc tubes of complex shapes. The method comprises molding alumina powders with different shrinkage rates into a green body. The green body is prefired to remove binders in the green body and then sintered. The resulting arc tube has an inner diameter that is smallest where the highest shrinkage powder was molded and an inner diameter that is greatest where the lowest shrinkage powder was used.

12 Claims, 2 Drawing Sheets

METHOD OF FORMING HYBRID ARC TUBES

BACKGROUND OF THE INVENTION

This invention relates to the ceramic arc tubes for use in high pressure metal vapor discharge lamps. More particularly, this invention describes a method for forming green ceramic structures which on subsequent sintering result in alumina arc tubes of complex geometries.

Metal vapor discharge lamps consist of an arc tube which holds metal vapor and a protective envelope surrounding the arc tube. The arc tube is required to have both a good translucency of light and a high corrosion resistivity against the light emitting material sealed within, such as sodium vapor or metal halide vapor. Presently, only alumina ceramics have been found to meet the need of high corrosion resistivity against the light emitting material and good translucency, so that alumina ceramics have been used almost exclusively for the arc tubes of high pressure metal vapor discharge lamps.

Typically, enclosed alumina arc tubes are manufactured for use in high pressure metal vapor discharge lamps. Alumina ceramics are used for arc tubes because they exhibit good dimensional stability at elevated temperatures and pressures, high thermal shock resistance and chemical endurance on repeated thermal cycling and high in-line and integrated transmission. Methods for producing these green alumina ceramic arc tubes include isostatic pressing either dry bag or wet bag, slip casting and the use of complex multi piece molds and inflation equipment.

The wet bag isostatic pressing technique for forming arc tubes consists of loading particulate materials of alumina, sintering agents and binding agents and unloading the plastic components outside the pressure vessel This process is labor intensive and requires considerable machining. In an example of one wet isostatic pressing technique a perforated rigid metal cylinder is lined with thin flexible rubber. The perforations allow the pressure transmitting fluid to come in contact with the thin rubber lining. A steel mandrel is located centrally in a rubber bung and the thin, flexible rubber lining is pulled over rubber bung and tied to prevent fluid in the pressure chamber from contacting the particulate aluminum materials. The other end of the perforated metal tube is also closed with a rubber bung and tied with the flexible rubber lining. The particulate material is then consolidated by compacting at pressures ranging from 60 to 100 MPa. The compacted alumina tube is removed carefully from the mandrel, prefired in air for several hours to improve the strength in handling of the green component for subsequent machining operation. Some form of vibratory motion during packing is generally necessary to achieve the uniform packing density and to avoid the swelling effect often seen on translucent tubes after sintering. The swelling effect is usually associated with poor packing of the alumina particulate matter.

In dry bag isostatic pressing, the tooling system is an integral part of the pressure vessel. Filling and removal of the particulate alumina mixture is accomplished mold removal. The technique is more suited for fast production. The dry bag tooling derives its name from the absence of contact of a flexible mold with the pressure transmitting fluid. The latter contacts only the thin rubber sheath lined externally around the flexible mold. The technique of fabricating the thin wall tubes consists of loading particulate alumina and sintering agents into a cavity formed by a mandrel and a mold. Once the particulate matter is loaded into the cavity, pressure is applied to the lined mold which in turn compacts the particulate material. Once the pressure is released the mold is taken apart and the green body of alumina is removed from the mandrel. The green body is ready for prefiring and subsequent sintering.

For the slip casting process, a slip is prepared by combining alumina powder, binders, wetting agents, sintering aids and dispersing agents in a selected casting liquid. The slip is allowed to age until its characteristics are relatively constant. The slip is then poured into a mold that has the capability of absorbing water and causing the wet powder to stick the mold wall. The excess slurry or slip is poured from the center of the mold, leaving a green body within the mold. Upon drying, this body shrinks from the mold wall and can be removed by opening the mold. At present, it is not known whether this method is used for the manufacture of arc tubes.

Another technique for producing ceramic arc tubes is disclosed in U.S. Pat. No. 4,387,067. In this patent a method for producing a green ceramic body is disclosed. The method consists of preparing and molding a mixture of alumina particles and plasticizer. A tubular green body is formed with a molding machine and subsequently placed within a fusiform cavity of a die and fluid pressure is applied to the inside of the tubular green body, so as to shape the tubular green body by inflating the middle portion of the die. The green shaped body is removed from the die and fired and sintered.

The above-identified methods for producing ceramic arc tubes all have serious drawbacks. The isostatic pressure methods are extremely labor intensive and are thus not conducive to large scale production. Furthermore, these methods require complex mandrels and bags. The method described in U.S. Pat. No. 4,387,067 requires complex molds and produces arc tubes wherein the wall thickness is not consistent over the entire length of the tube. The present invention solves these problems and results in a considerable savings of time and labor. In addition, the present invention allows one to create arc tubes of relatively complex shapes without requiring complex molds or mandrels.

SUMMARY OF THE INVENTION

The present invention facilitates the production of sintered ceramic bodies with complex internal and external configurations without the need of complex mandrels, molds or bags. It is known that using standard preparation procedures, one can tailor powders to specific shrinkages. Using such powders it is possible to select the correct percentage of shrinkages to yield arc tubes of the proper final geometry. Powders are selected with different shrinkages, and are compacted into a urethane bag. In one aspect of the invention, the filling of the bag proceeds by loading one-third of the tube length with a first shrinkage powder, loading the center portion with a second shrinkage powder and loading the last third with the first shrinkage powder. After the powder is loaded it is compacted isostatically and the urethane bag is removed. The mandrel is removed from the center of the tube and the resulting green tube is prefired in air to remove binders and increase the green strength. Sintering is then carried out on the tube. The resulting sintered tube is formed with an inner diameter that is greater in the middle than at the end portions as the second powder shrinks less than the first powder.

In a second aspect of the invention an arc tube which has a high transmittance in the central portion of the tube and a lower transmittance in the end portions of the tube is manufactured. This is accomplished by loading one-third of the tube length with low transmittance powder, loading the center portion with a high transmittance powder and loading the final third with a low transmittance powder. This fabrication method produces a high transmittance arc tube at a lower cost as the low transmittance powder is less expensive than the high transmittance powder.

OBJECTS OF THE INVENTION

It is an object of the present invention to produce alumina arc tubes with complex geometries.

Another object of the present invention is to produce alumina arc tubes with complex geometries wherein the wall thickness is uniform over the entire arc tube.

Yet another object of the present invention is to produce complex arc tubes without the requirement of complex molds or mandrels.

For a better understanding of the present invention, together with other and further objects, advantages in capabilities thereof reference is made to the following drawings, detailed description and appended claims in connection with the preceding description of the invention.

DETAILED DESCRIPTION OF THE PREFERRED EMBODIMENTS

Figure 1:
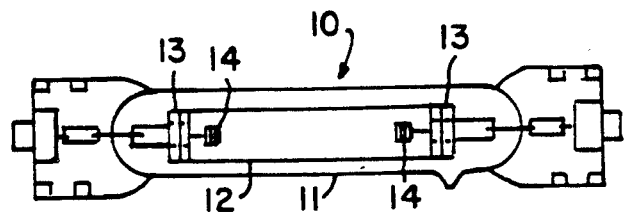
FIG. 1 shows a high pressure metal vapor lamp in a silica jacket.

FIG. 1 depicts a metal halide lamp 10 consisting of an outer tube 11 and an inner tube or discharge tube 12 made of alumina or the like. The arc tube 12 is closed off by disks 13 which are preferably made of an aluminum oxide ceramic. The disks 13 are formed with openings through which coiled electrodes 14 of tungsten or a similar material are secured. The entire end connection 13 of the arc tube 12 is closed off so that it is gas and pressure tight. The arc tube 12 is filled with a metal vapor such as sodium. The electrodes 14 are connected to a current source so that when activated with the proper voltage the lamps produce a luminous output.

Figure 2:
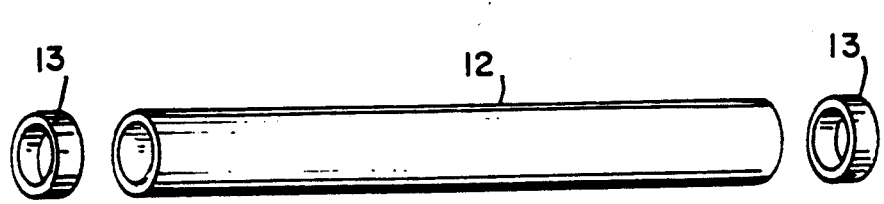
FIG. 2 shows a conventional alumina arc tube.
Figure 3:
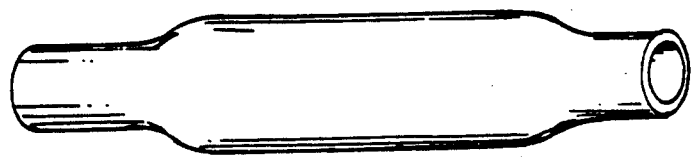
FIG. 3 shows a hybrid alumina arc tube produced in the method of the present invention.
Figure 4:
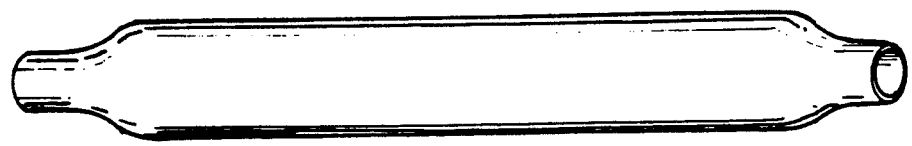
FIG. 4 shows a second embodiment of an alumina arc tube made by the method of the present invention.
Figure 5:
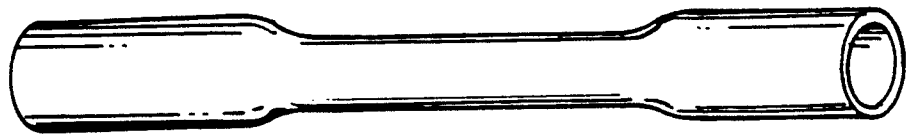
FIG. 5 shows another embodiment of an alumina arc tube made from the method of the present invention.

Shown in FIG. 2 is a conventional arc tube 12. This arc tube is made by molding the tube on mandrel and then withdrawing the mandrel from the inner tube after forming. The tube is then fired and sintered to produce the alumina arc tube. In the making of such arc tubes only straight sided tubes can be made because removal of the mandrel would not allow for a different diameter. However, in some applications it is advantageous to have a bubble or flare in the middle of the tube such as shown in FIGS. 3 and 4. The present invention allows one to make an arc tube having a complex shape using a noncomplex mandrel. To form a tube as shown in FIGS. 3 and 4, a first powder with a high shrinkage rate is compacted into a urethane bag for the first portion of the tube length. The central portion of the tube length is filled with a second, lower shrinkage powder followed by the final portion of the bag being filled with the high shrinkage powder. The tube is isostatically pressed at 60 to 180 MPa thereby consolidating the powder around the inner mandrel. The arc tube is removed from the bag and the mandrel is easily removed the tube is prefired in a furnace at approximately 1,200° C. for approximately 2 hours. The tube is then sintered at approximately 1,860° C. to form the final arc tube. Due to the different shrinking rates in the powders, an arc tube is formed wherein the outer edges have a smaller inner diameter than the central portion.

In another aspect of the present invention arc tubes wherein the inner diameter is greater on the end portions than on the central portion are produced by adding low shrinkage powder to the end portions and high shrinkage powder to the central portion.

In addition to allowing one to make arc tubes of complex shapes, the above described method also allows one to make an arc tube of two alumina powder batches, one of a high transmittance and a second lower transmittance powder. The lower transmittance powder is less expensive than the high transmittance powder. The lower transmittance powder is used at the ends of the molds while the high transmittance powder is used in the central portion of the mold. Tubes made from this method are less expensive than tubes with one powder yet they also contain the high transmittance at the central portion of the tube.

EXAMPLE 1

Two powders were selected, one with a 16% shrinkage and a second with a 24% shrinkage powder. The 24% shrinkage powder is aluminum powder which is preferably 99.96% pure alumina and most preferably 99.99% pure alumina and contains 65% by weight alpha aluminum oxide and 35% by weight gamma aluminum oxide. The mean specific area of the powder was about 30 $m^2/g$ or an average crystallite size of about 0.05 microns. Two percent by weight of the 24% shrinkage powder is binder which is removed during processing. The 16% shrinkage powder is alumina powder which is preferably 99.96% pure and most preferable 99.99% pure and contains 85% by weight alpha aluminum oxide and 15% by weight gamma aluminum oxide. The mean specific area of the 16% shrinkage powder is approximately 6.5 $m^2/g$ Again, the initial powder contained approximately 2% by weight of binders which is removed during processing.

Binder materials include methyl cellulose and polyvinyl alcohol or any other materials which evaporate sublimate or decompose at relatively low temperatures, preferably below 500° C. and leave no significant residue. The 24% shrinkage powder was compacted into a urethane bag filling one third of the tube length. The center third portion was filled using a 16% shrinkage powder followed by the final third being filled with a 24% shrinkage powder. The tube was isostatically pressed to 20 K psi and then removed from the bag. At this point, it was very easy to see the areas of different powders. The high shrinkage powder has a slight tan color while the low shrinkage powder was very white. The inner mandrel of the tube was removed very easily.

At this point, the green tube was prefired in air for two hours at 1200° C. to remove binders and increase the green strength. Sintering of the prefired tubes was carried out at 1830° for three hours. The tube sintered to an outside diameter of 0.315 inches at each end and 0.342 inches in the center portion. The inner diameter was 0.27 inches at each end with an inner diameter of 0.285 inches in the center.

As a result of the described invention, sintered alumina ceramic arc tubes with complex internal and external configurations can be made without the need of complex mandrels or bags. The present invention eliminates the need for new tooling as present production methods can be used to make arc tubes of complex geometries. Considerable time, labor and powder can be saved by the above-described method. The separate fabrication required for the installation of the mandrels can be eliminated.

The foregoing description has been set forth to illustrate the invention and is not intended to be limiting. Since modifications of the described embodiments incorporating the spirit and substance may occur to those persons skilled in the art, the scope of the invention is to be limited solely with respect to the appended claims and equivalents.

What is claimed is:

1. A method of forming an alumina arc tube of complex shape comprising:
   loading a first mixture of alumina powder around a first portion of a mandrel;
   loading a second mixture of alumina powder around a second portion of the mandrel;
   loading the first mixture of alumina powder around a third portion of the mandrel, wherein the first mixture of alumina powder has a higher shrinkage rate than the second mixture of alumina powder;
   applying pressure to the first and second mixtures of alumina powder to form a green body of alumina powder;
   removing the mandrel from an inner surface of the green body;
   prefiring the green body; and
   sintering the prefired green body to form an alumina arc tube.

2. The method according to claim 1 wherein the first mixture of alumina powder comprises 98% by weight alumina at a purity of at least 99.96% and 2% by weight of binders wherein the alumina comprises approximately 65% by weight alpha aluminum oxide and approximately 35% by weight gamma alumina oxide.

3. The method according to claim 1 wherein the second mixture of alumina powder comprises 98% by weight alumina at a purity of at least 99.96% and 2% by weight binders wherein the alumina comprises approximately 85% by weight alpha alumina oxide and approximately 15% by weight gamma alumina oxide.

4. The method according to claim 1 wherein the prefiring is carried out at approximately 1200° C. for approximately 2 hours in air.

5. The method according to claim 1 wherein the sintering is carried out at approximately 1830° C. for approximately 3 hours in hydrogen.

6. A method of forming an alumina arc tube comprising:
   loading a first mixture of alumina powder around a first portion of a mandrel;
   loading a second mixture of alumina powder around a second portion of the mandrel;
   loading a third mixture of alumina powder around a third portion of the mandrel, wherein the first alumina powder, the second alumina powder and the third alumina powder have different shrinkage rates;
   applying pressure to the alumina powders to form a green body of alumina powder;
   removing the mandrel from an inner surface of the green body;
   prefiring the green body; and
   sintering the prefired green body to form an alumina arc tube.

7. A method of forming an alumina arc tube of complex shape comprising:
   loading a first mixture of alumina powder around a first portion of a mandrel;
   loading a second mixture of alumina powder around a second portion of the mandrel;
   loading the first mixture of alumina powder around a third portion of the mandrel, wherein the second mixture of alumina powder has a higher transmittance than the first mixture of alumina powder;
   applying pressure to the first and second mixtures of alumina powder to form a green body of alumina powder;
   removing the mandrel from an inner surface of the green body;
   prefiring the green body; and
   sintering the prefired green body to form an alumina arc tube.

8. The method according to claim 10 wherein the first mixture of alumina powder comprises 98% by weight alumina at a purity of at least 99.96% and 2% by weight of binders wherein the alumina comprises approximately 65% by weight alpha aluminum oxide and approximately 35% by weight gamma alumina oxide.

9. The method according to claim 10 wherein the second mixture of alumina powder comprises 98% by weight alumina at a purity of at least 99.96% and 2% by weight binders wherein the alumina comprises approximately 85% by weight alpha alumina oxide and approximately 15% by weight gamma alumina oxide.

10. The method according to claim 10 wherein the prefiring is carried out at approximately 1200° C. for approximately 2 hours in air.

11. The method according to claim 7 wherein the sintering is carried out at approximately 1830° C. for approximately 3 hours in hydrogen.

12. A method of forming an alumina arc tube comprising:
   loading a first mixture of alumina powder and a portion of a mandrel;
   loading a second mixture of alumina powder around a second portion of the mandrel;
   loading a third mixture of alumina powder around a third portion of the mandrel, wherein the first alumina powder, the second alumina powder and the third alumina powder have different transmittance rates;
   applying pressure to the alumina powders to form a green body of alumina powder;
   prefiring the green body; and
   sintering the prefired green body to form an alumina arc tube.

* * * * *